United States Patent [19]

Nelson et al.

[11] Patent Number: 5,989,668
[45] Date of Patent: Nov. 23, 1999

[54] WATERPROOF LAMINATE PANEL

[76] Inventors: Thomas J. Nelson, 926 Crescent, Belton, Tex. 76513; Robert Richard Krebs, 3709 Shell Rd., Georgetown, Tex. 78628; Joel Lane Williams, P.O. Box 104, Pendleton, Tex. 76564; Donald Murray Marshall, 4101 West Adams, Apt. 415; David Wayne Pruitt, 3610 Gila Trail, both of Temple, Tex. 76504; Victoria Lynn Stolarski, 16601 FM 1325, Apt. 2331, Austin, Tex. 78728; Virgil Bedell Canady, 7317 East FM 436-150, Temple, Tex. 76501; Mark Thomas Krejchi, 10915 Lake Whitney Dr.; Janet Rose Stepan, 4714 Box Canyon Dr., both of Temple, Tex. 76502

[21] Appl. No.: 09/173,065

[22] Filed: Oct. 16, 1998

[51] Int. Cl.$^6$ .................................................. B32B 27/42
[52] U.S. Cl. ......................... 428/50; 428/322.2; 428/530; 428/542.2
[58] Field of Search .................................. 428/537.1, 44, 428/320.2, 322.2, 911, 50, 530, 542.2; 52/408

[56] References Cited

U.S. PATENT DOCUMENTS

| | | |
|---|---|---|
| 4,585,605 | 4/1986 | Katdota et al. . |
| 4,724,187 | 2/1988 | Ungar et al. . |
| 4,788,088 | 11/1988 | Kohl . |
| 5,059,580 | 10/1991 | Shibata et al. . |
| 5,137,764 | 8/1992 | Doyle et al. . |
| 5,145,748 | 9/1992 | Gaidis et al. . |
| 5,187,915 | 2/1993 | Alexander . |
| 5,439,749 | 8/1995 | Klasell et al. . |

FOREIGN PATENT DOCUMENTS

WO 98/50207  11/1998  WIPO ............................... B27N 3/02

*Primary Examiner*—Deborah Jones
*Assistant Examiner*—Jason Savage
*Attorney, Agent, or Firm*—Aquilino & Welsh

[57] ABSTRACT

A waterproof laminate panel is disclosed. The panel includes a decorative layer and a backing layer. The backing layer is composed of at least one resin impregnated layer bound to a waterproofing layer which substantially prevents the penetration and release of moisture from the panel so as to maintain a constant moisture content within the decorative panel. The resin impregnated layer faces the decorative layer and the waterproofing layer is exposed to an external environment.

23 Claims, 6 Drawing Sheets

WATERPROOF LAMINATE PANEL

BACKGROUND OF THE INVENTION

1. Field of the Invention

The invention relates to waterproof laminates. More particularly, the invention relates to waterproof laminated panel products which are not susceptible to environmental conditions. Flooring panels are referred to through out the following disclosure in an exemplary manner, and those of ordinary skill in the art will readily appreciate that the present laminates may be used in a wide variety of applications.

2. Description of the Prior Art

Decorative laminates have found wide use as the ability to replicate natural materials has substantially improved over the years. For example, decorative laminates have replaced natural materials in the construction of furniture, cabinets, and countertops. In each of these applications, a decorative surface is applied to a substrate, namely, plywood, particle board, chipboard, medium density fiberboard, etc. Typically, a backing layer is secured to the opposite side of the substrate. Since furniture, cabinets and countertops, as well as other applications in which decorative laminates are employed, generally do not encounter destructive environmental forces, the moisture response characteristics of the decorative laminates are not a primary concern.

However, not all decorative laminates are used in environments where their exposure to moisture may be readily controlled and monitored. For example, flooring panels are constantly exposed to dual competing environments which may damage the floor. Specifically, all flooring panels are exposed to an "A environment" above the flooring panel (that is, the controlled environment commonly found in a home or office) and a "B environment" below the flooring panel (that is, the environment existing in the floor boards, concrete, crawl spaces, etc. located below the flooring panel). Most prior art flooring panels are, however, not designed to exist between the competing A and B environments. Where prior art flooring panels are designed with the competing A and B environments in mind, the prior art flooring panels employ costly and/or bulky constructions in confronting the dual environments.

Flooring panels 10 are commonly manufactured with a decorative layer 12, a substrate 13 and a backing layer 14 as shown in FIG. 1. The decorative layer 12 is commonly exposed to the A environment, which typically does not present the wealth of problems that the B environment presents to the backing layer 14, which may subsequently affect the substrate 13. The decorative layer 12 commonly consists of two layers of phenolic resin impregnated kraft paper 16, 18, a pattern layer 20, and a melamine overlay layer 22 incorporating $AlO_2$ for wear resistance. The backing layer 14, from bottom up, is commonly composed of melamine impregnated paper 24 and two layers of phenolic resin impregnated kraft paper 26, 28. As discussed above, the substrate 13 may be chosen from a variety of materials, namely, plywood, particle board, chipboard, medium density fiberboard etc.

As those of ordinary skill in the art will certainly appreciate, the decorative and backing layers discussed above are purely exemplary. Decorative and backing layers may take various forms and employ laminate layers in a variety of combinations.

While melamine impregnated paper acts as a barrier for water, the melamine layer reacts adversely when exposed to water vapor, or relative humidity (commonly found when water attempts to escape from moist floor boards or concrete). Similarly, the phenolic layers, and even most substrates, tend to expand substantially when exposed to moisture.

In view of the panel construction commonly employed, the decorative layer, substrate and backing layer react to the difference between the two environments when the A and B environments compete. As in most circumstances where an object is pulled in opposite directions by multiple forces, a flooring panel sitting between two distinct and different environments will often fail to remain flat. For example, where excess moisture exists in the B environment, the flooring panel will generally expand along its bottom surface causing the flooring panel to warp with its lateral edges pointing upwardly (positive warping). Such warping is highly aesthetically and functionally undesirable.

Negative warping (that is, expansion of the top layer causes the edges to the panel to bow downwardly) is less common with flooring panels since the upper surface of the flooring panels are generally not exposed to the environmental conditions which could result in the expansion of the upper surface of the flooring panels. Specifically, the A environment is well controlled through the use of heating systems, air conditioners, general cleaning, and the like. For example, where water is spilled on a floor, the water will generally be wiped up or evaporate into the atmosphere before it negatively affects the top layers of the flooring panel. Similarly, relative humidity and temperature are generally controlled by those people living in the specific environment.

If moisture does enter the flooring panel from the A environment and causes the decorative layer of the flooring panel to expand and negatively warp, the warping may be easily corrected by controlling the A environment, over which people have ready control. When the A environment is controlled, excess moisture held therein is released and the flooring panel generally returns to original shape.

In addition, negative warping is generally less noticeable than positive warping. Where the center of a panel bows upwardly (negative warping), most consumers will not notice the slight roll in the flooring panel. However, the upwardly extending edges found in positively warped panels are very noticeable.

The prior art has previously attempted to remedy the problems associated with warping flooring panels by either attempting to balance the layers employed in the construction of the panels or employing strong backings which resist the warping forces created by the presence of moisture. Neither remedy has been met with total success.

While balancing is highly successful where both sides of a laminate are exposed to the same environmental conditions, balancing does not produce similar results where the top and bottom surfaces of a laminate are exposed to very different environments, and this is where warpage becomes noticeable.

The approach taken in designing backing layers when confronting moisture problems in the B environment is compounded by the testing procedures currently used throughout the industry. These testing procedures do not consider the differences between the A and B environments, but rather concentrate on the attempts to balance the expansion and contraction of the layers on opposite sides of the panel.

Specifically, conventional testing procedures suggest that the panel should be exposed to humidity levels ranging from 30% to 90% over an extended period of time. While such testing may be appropriate where the panel is to be exposed to the same environment on opposite sides, this is not the case for flooring panels. As discussed above, flooring panels are constantly exposed to two very different environments; the environment above the flooring panel (the A environment) and the environment below the flooring panel (the B environment). The prior testing procedures fail to consider the differences and, therefore, fail to properly evaluate the appropriateness of the flooring panels for actual use.

As such, a need exists for a flooring panel which is not susceptible to the harm presented by exposure to moisture. In addition, a need exits for a waterproof laminate which may be used in a wide range of applications. A need further exists for a laminate product which accounts for different environments encountered on opposite sides of the laminate product.

SUMMARY OF THE INVENTION

It is, therefore, an object of the present invention to provide a decorative panel including a decorative layer and a backing layer. The backing layer is composed of multiple layers bound together, wherein the bottom layer of the backing layer substantially prevents the penetration of moisture.

It is also an object of the present invention to provide a laminate including a substrate layer, a thermoplastic layer and a hydrophobic waterproofing layer which substantially prevents the penetration moisture.

It is a further object of the present invention to provide a waterproof laminate for use with decorative panels. The laminate includes a substrate layer and a hydrophobic waterproofing layer which substantially prevents the penetration of moisture.

It is another object of the present invention to provide a laminate including a first layer composed of a styrene-maleic anhydride copolymer and a second layer composed of a polymer.

Other objects and advantages of the present invention will become apparent from the following detailed description when viewed in conjunction with the accompanying drawings, which set forth certain embodiments of the invention.

DESCRIPTION OF THE PREFERRED EMBODIMENTS

The detailed embodiments of the present invention are disclosed herein. It should be understood, however, that the disclosed embodiments are merely exemplary of the invention, which may be embodied in various forms. Therefore, the details disclosed herein are not to be interpreted as limited, but merely as the basis for the claims and as a basis for teaching one skilled in the art how to make and/or use the invention.

Figure 1:
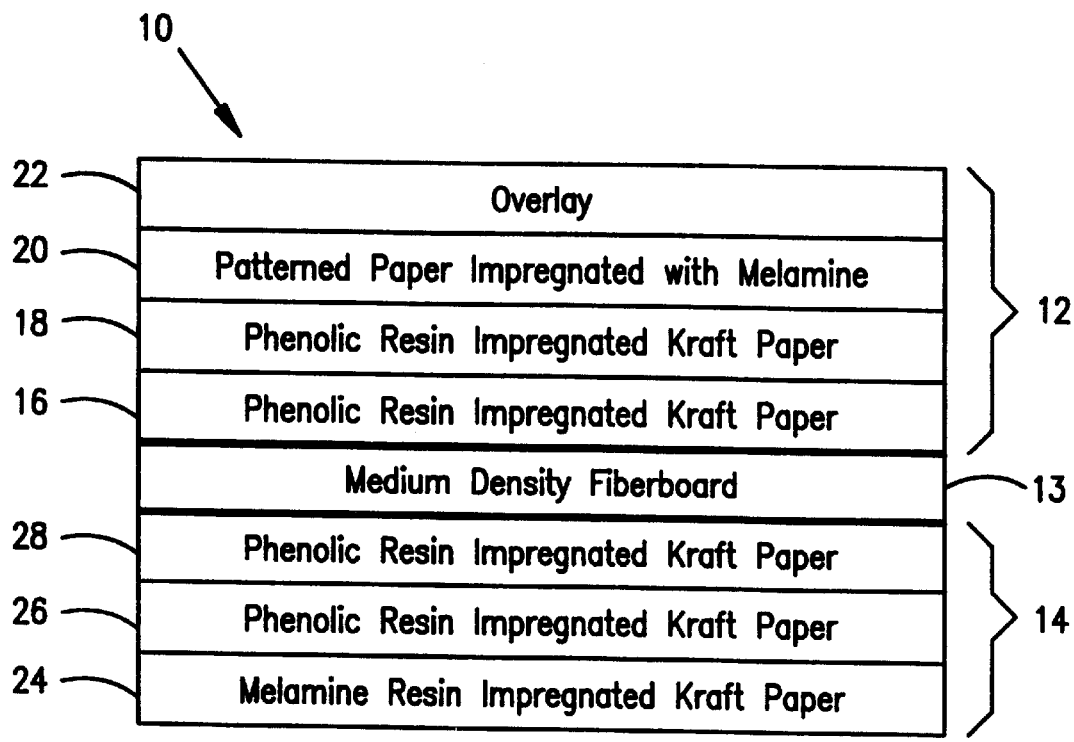
FIG. 1 is a schematic of a prior art flooring panel.
Figure 2:
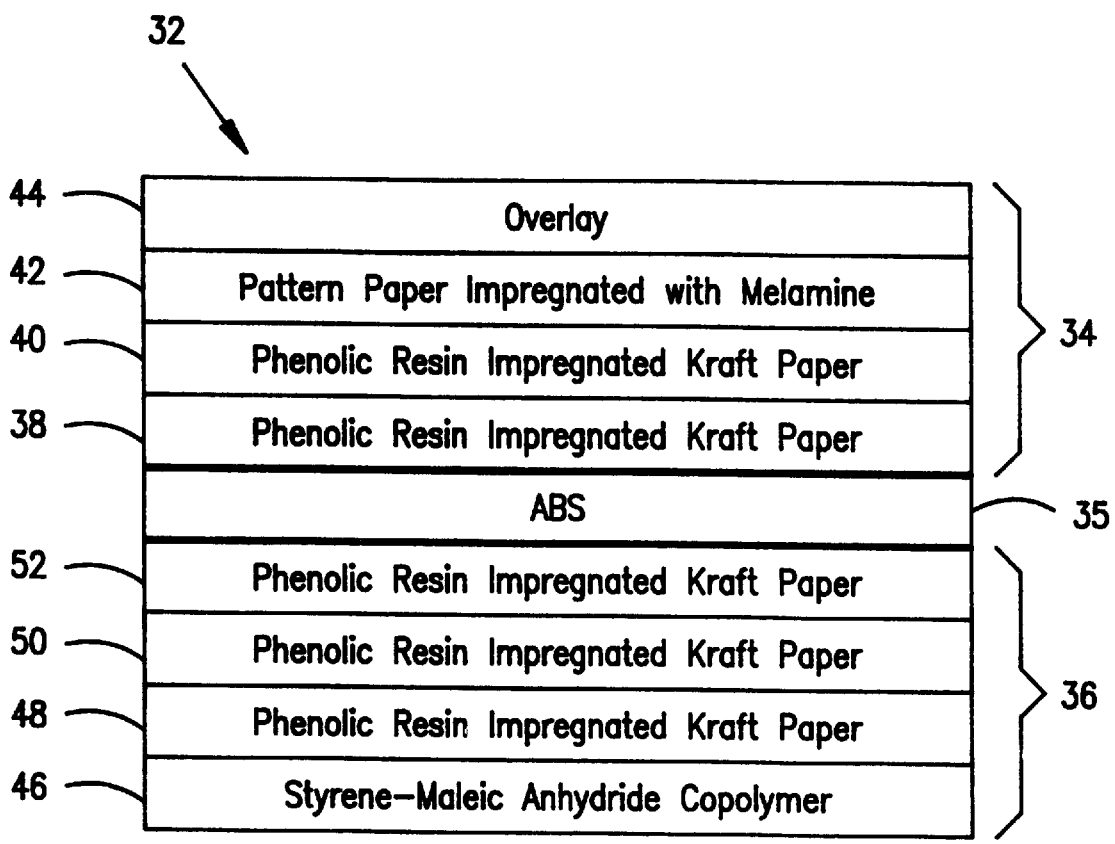
FIG. 2 is a schematic of a flooring panel in accordance with the present invention.

With reference to FIG. 2, a flooring panel 32 in accordance with the present invention is disclosed. The flooring panel 32 in accordance with the present invention is not only water repellant, but it is substantially waterproof. As with conventional flooring panels, the present flooring panel 32 includes a decorative layer 34, a substrate 35 and a backing layer 36. The decorative layer 34 and the backing layer 36 are respectively bound to the substrate 35 in a conventional manner to form the present flooring panel 32.

The exemplary decorative layer 34 includes two layers of phenol formaldehyde resin impregnated kraft paper 38, 40, a pattern layer 42, and an overlay 44 including $AlO_2$ for wear resistance. The bottom resin impregnated layer 38, i.e., the back of the decorative layer 34, is sanded for bonding with the substrate 35.

The decorative layer 34 discussed above is considered to be exemplary of decorative layers that may be used in accordance with present invention. Decorative layers may take various forms and employ laminate layers in a variety of combinations without departing from the spirit of the present invention. As such, the resin impregnated layers of the present backing layer 36 may be varied to complement changes in the decorative layer 34 without departing from the spirit of the present invention.

In accordance with the preferred embodiment of the present invention, the backing layer 36 includes, from bottom up, a hydrophobic waterproof layer 46 and three layers of phenol formaldehyde resin impregnated kraft paper 48, 50, 52. As with the bottom resin impregnated layer 38 of the decorative layer 34, the top resin impregnated layer 52 of the backing layer 36 is sanded for bonding with the substrate 35.

The hydrophobic waterproof layer 46 is preferably DYLARK, a styrene-maleic anhydride copolymer manufactured by NOVA Chemicals, Inc. DYLARK exhibits outstanding bonding characteristics with the phenolic resin impregnated kraft paper. The excellent bonding characteristics are a result of the carboxyl groups found on the maleic anhydride of the DYLARK copolymer. The carboxyl groups bind with the phenolic resin to produce a very stable laminate. Although DYLARK is disclosed as the preferred material for the bottom layer of the backing, other functionally and structurally equivalent polymers may be used without departing from the spirit of the present invention.

In addition, although phenol formaldehyde resin impregnated kraft paper is used in accordance with the preferred embodiment of the present invention, other resin impregnated papers (or similar materials) may be used without departing from the spirit of the present invention.

The substrate 35 is preferably poly(acrylonitrile-c-butadiene-c-styrene) (ABS) foam. Commonly assigned U.S. patent application Ser. No. 08/978,026, entitled "POLYMERIC FOAM SUBSTRATE AND ITS USE IN COMBINATION WITH DECORATIVE SURFACES," filed Nov. 25, 1997, discloses ABS substrates which may be used in accordance with the present invention. As such, U.S. patent application Ser. No. 08/978,026 is incorporated herein by reference. While ABS foam is disclosed for use with the embodiment disclosed in FIG. 2, alternate embodiments of the present invention employ other substrate materials without departing from the spirit of the present invention.

The construction of the backing layer 36 and the substrate 35 results in a waterproof flooring panel 32 which is not susceptible to the harmful environmental conditions commonly found in the B environment. Specifically, the ABS substrate 35 and styrene-maleic anhydride copolymer layer 46 create a moisture barrier which protects the resin impregnated layers 48, 50, 52 from the undesirable effects of moisture.

It is not only desirable to prevent moisture from penetrating the backing layer 36 but also to maintain the original as-manufactured moisture content of the panel 32 to prevent panel warpage. The present invention focuses on countering the effects of the differential between the A and B environments on panel features, whether that differential involves extreme moisture or extreme dryness.

The resin impregnated layers 48, 50, 52 are maintained in the present backing layer 36 to balance the resin impregnated layers commonly found in decorative layers which may be used in conjunction with the disclosed backing layer 36. That is, the resin impregnated layers in the decorative layer 34 and the backing layer 36 similarly expand and contract as a result of temperature to maintain the substantially flat configuration of the flooring panel 32. If the resin impregnated layers 48, 50, 52 in the backing layer 36 were not included, the decorative panel 34 would expand and contract at a different rate than the backing layer 36. This would cause the flooring panel 32 to warp in an undesirable manner. As such, it should be appreciated by those of ordinary skill in the art that the phenolic layers may be varied without departing from the spirit of the present invention to maintain a balanced relation between the backing layer 36 and the decorative layer 34.

Figure 3:
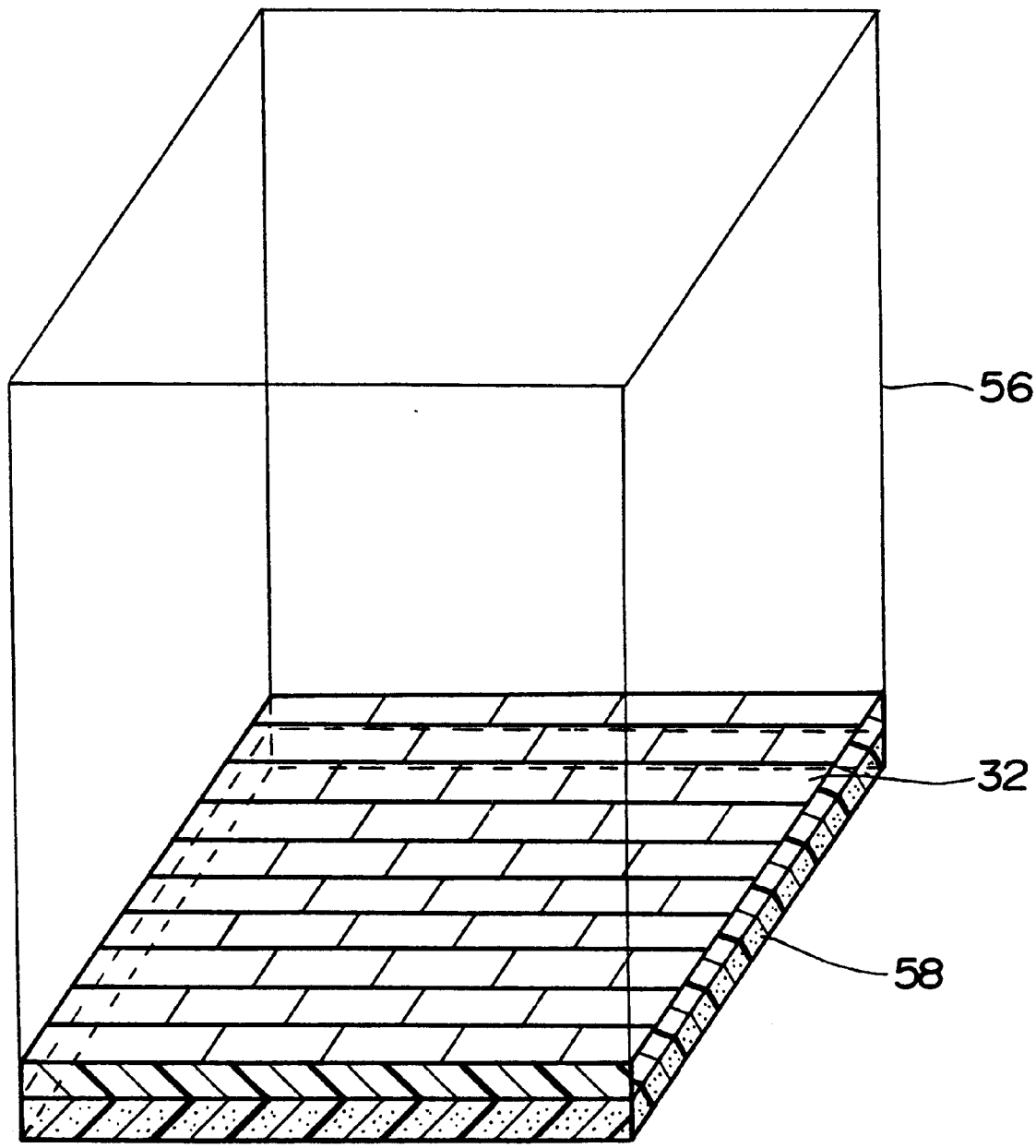
FIG. 3 is a perspective view of a testing chamber in accordance with the present invention.

The present flooring panel 32 has been substantially tested to evaluate its reaction to moisture commonly encountered in the B environment. In accordance with the preferred embodiment of the present invention, the flooring panels 32 are tested within an environmentally controlled room 56 (see FIG. 3). Specifically, a bound urethane pad 58 is positioned to fully cover the floor of the environmentally controlled room 56. The pad 58 is preferably REBOND™, and is manufactured by E.R. Carpenter, Co., Temple, Tex. The pad 58 is positioned with its bottom side upwardly directed (this enhances the pad's ability to absorb water poured therein). The pad 58 is then soaked with water to simulate an extremely wet B environment.

The flooring panels 32 are installed on the water soaked pad 58 as if they were being installed on a normal floor. As such, the flooring panels 32 are installed to cover the entire floor of the room 56, and molding is installed about the edges of the flooring. If portions of the pad 58 are exposed, they may be covered with ABS sheets to prevent water evaporation.

Once the flooring panels 32 are properly installed upon the wet pad 58, the environmental conditions within the room 56 are varied over seven days with a temperature ranging from approximately 50° F. to 120° F. (10° C. to 49° C.) and a relative humidity ranging from approximately 0% to 95%. After seven days in this environment, the flooring panels 32 were observed and found to remain substantially flat.

Control tests were performed with prior art flooring panels. The control panels tested all exhibited substantial warping and degradation as a result of the test conditions.

Figure 4:
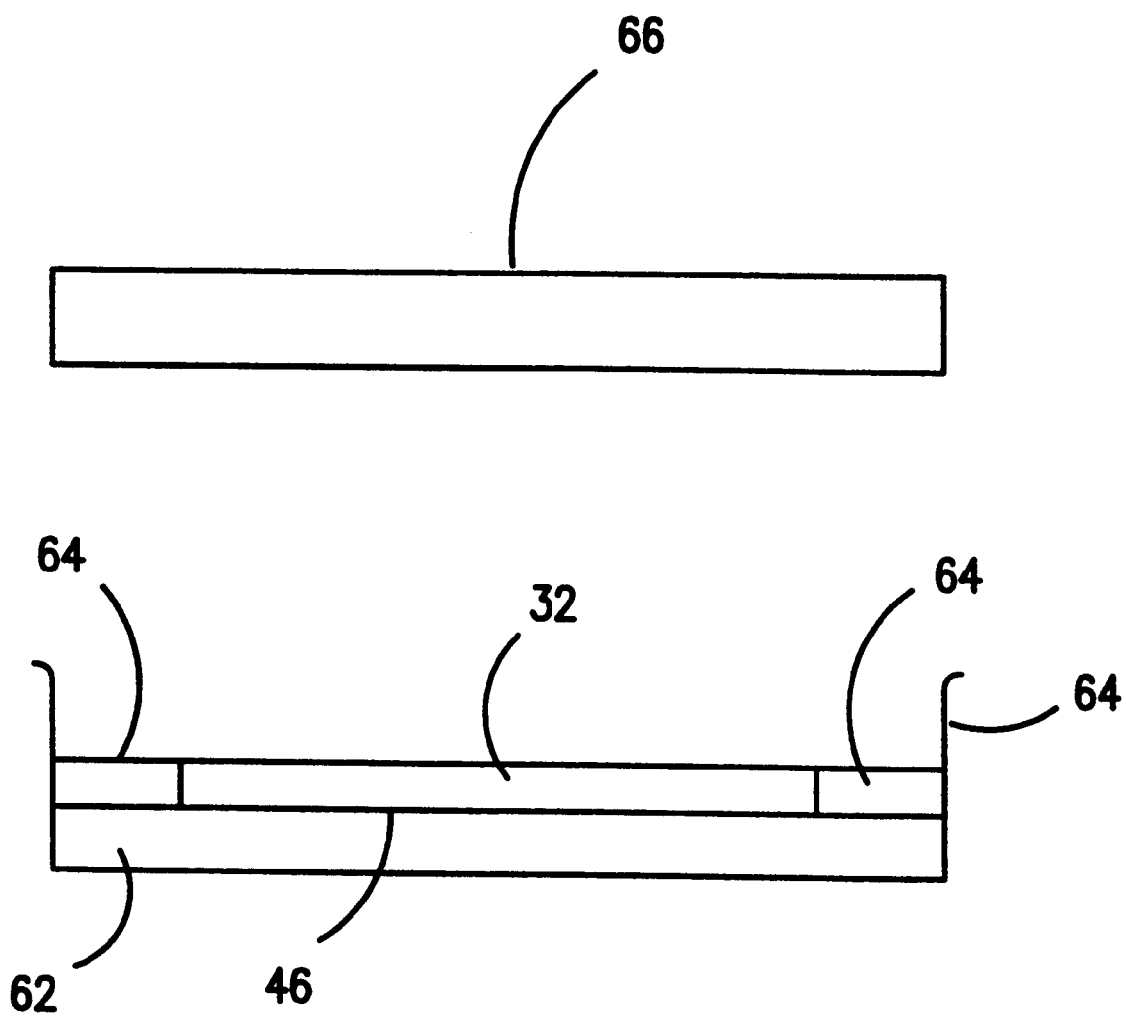
FIG. 4 is a schematic of a small scale testing apparatus in accordance with the present invention.

Similar small scale tests were also conducted (see FIG. 4). Specifically, foam pad 62 is placed in a steel tray 64 sized to accommodate one or two flooring panels 32. The foam pad 62 is soaked with water and the panels 32 are placed on the pad 62 with the styrene-maleic anhydride copolymer layer 46 down. The remaining exposed pad 62 is covered with ABS sheets 65 to prevent the undesired evaporation of water from the pad 62. The panels 32 are then allowed to sit for approximately 16 hours, after which a heat source 66 above the tray 64 is used to heat the decorative surface 34 of the flooring panels 32. The heat source 66 remains on for approximately seven hours, during which the temperature reaches approximately 125° F. (52° C.). After seven hours of heat, the flooring panels 32 are removed and studied.

As with the larger scale testing, the flooring panels 32 in accordance with the present invention exhibited an absence of warping and remained substantially flat. In addition, control tests were performed with prior art flooring panels. The control panels tested all exhibited substantial warping and degradation as a result of the test conditions.

Figure 5:
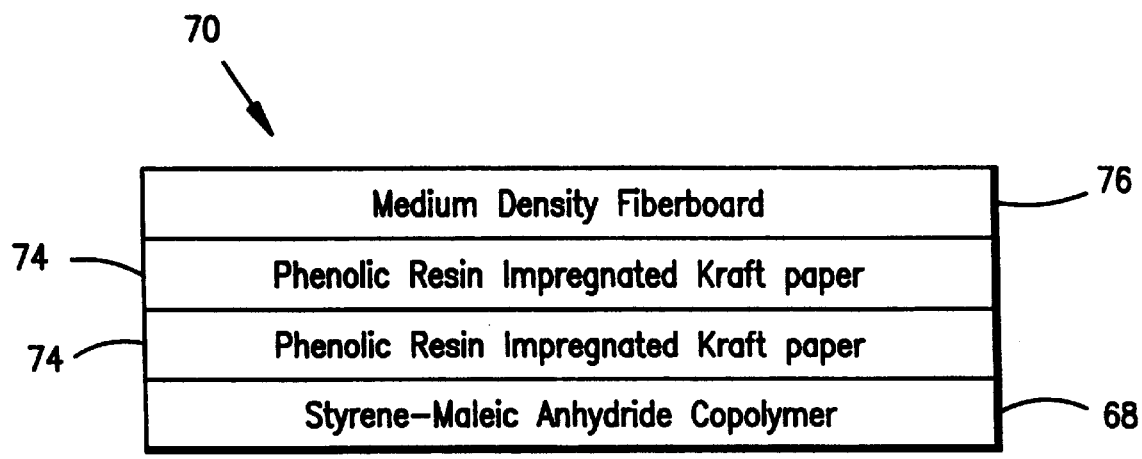
FIG. 5 is a schematic of an alternate embodiment of a backing layer in accordance with the present invention.

The moisture barrier properties of styrene-maleic anhydride copolymer, as well as the bonding properties between styrene-maleic anhydride copolymer and the phenolic resin impregnated kraft paper, may be similarly incorporated with conventional backing layers in accordance with the present invention. Specifically, and with reference to FIG. 5, the melamine layer discussed above may readily be replaced with a styrene-maleic anhydride copolymer layer 68 to create a backing layer 70 and substrate 76 less susceptible to the undesirable effects of moisture.

When a styrene-maleic anhydride copolymer layer 68 is applied in this way, the resulting backing layer 70 includes, from the bottom up, a styrene-maleic anhydride copolymer layer 68 and two layers of phenolic resin impregnated kraft paper 72, 74. As with the embodiment disclosed in FIG. 2, the resin impregnated layers may be varied to suit various applications without departing from the spirit of the present invention. The backing layer 68 is bound to a medium density fiberboard substrate 76. In use, the styrene-maleic anhydride copolymer layer 68 protects the resin impregnated layers 72, 74 and the substrate 76 from moisture which may be encountered in the B environment.

In this way, conventional flooring panels with medium density fiberboard substrates, or other substrate materials adversely effected by moisture, may be constructed such that they are resistant to the moisture problems commonly found in the B environment. Specifically, the styrene-maleic anhydride copolymer prevents water vapor from penetrating the backing layer, which would otherwise cause warpage.

Figure 6:
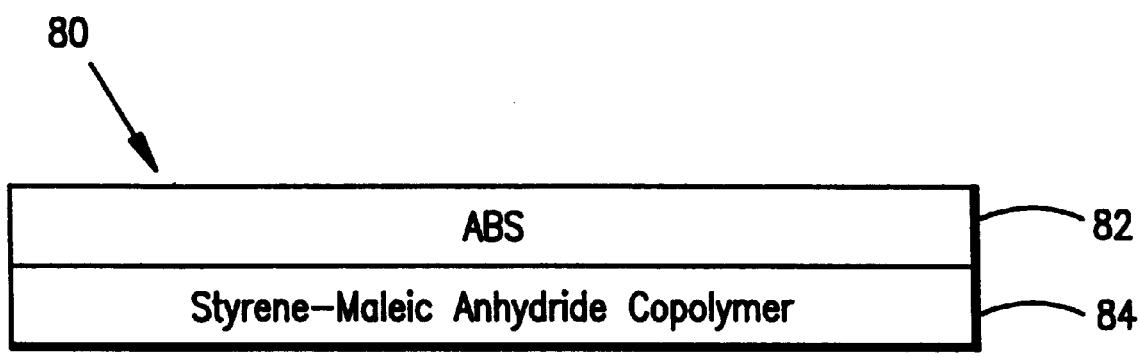
FIG. 6 is a laminate made in accordance with the present invention.
Figure 4:
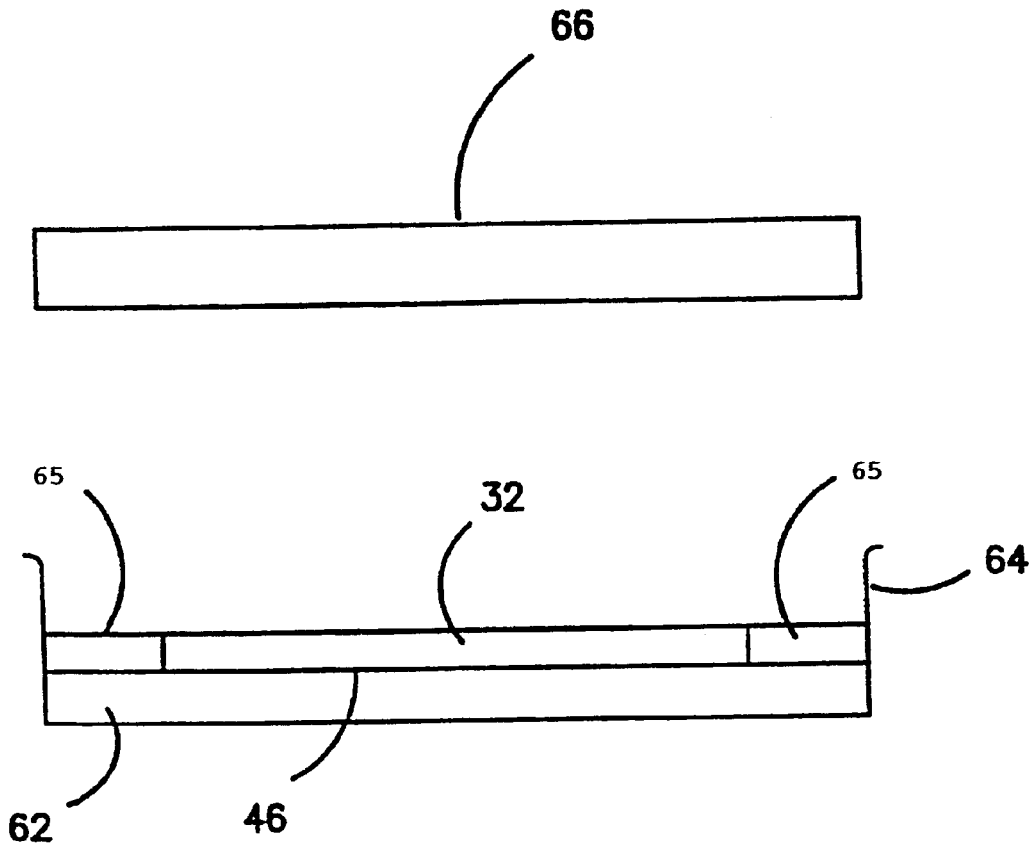

A further embodiment for a backing layer/substrate 80 is disclosed in FIG. 6. This embodiment includes only a substrate 82 and a styrene-maleic anhydride copolymer layer 84. The substrate 82 is preferably ABS foam, although other substrate materials may be used without departing from the spirit of the present invention. The resin impregnated layers are normally included to balance the resin impregnated layers found in conventional decorative layers. The backing layer/substrate 80 consisting of an ABS foam layer 82 and a styrene-maleic anhydride copolymer layer 84 may be employed where the decorative layer is self balancing.

Although DYLARK has been disclosed as the preferred material for the bottom layer of the backing layer, other moisture barrier materials may be used without departing from the spirit of the present invention. For example, it has been found that aluminum films, ABS films, and other metal films show good results when used in accordance with the present invention. In addition, it is contemplated that the following grafting monomers could copolymerize with styrene, or other monomers, and yield films which bond to the phenolic resin impregnated paper layers of the backing layer: α,β-ethylenically unsaturated carboxylic acids and anhydrides, including derivatives of such acids and anhydrides, for example, crotonic acid, acrylic acid, methacrylic acid, sorbic acid, cinnamic acid, maleic acid, fumaric acid, itaconic acid, tetrahydrophthalic anhydride, dodecenyl succinic anhydride, itaconic anhydride, maleic anhydride and substituted maleic anhydride (e.g., dimethyl maleic anhydride), mono- and disodium maleate, acrylamide, maleimide and diethyl fumarate.

In addition, although the laminates described above have been disclosed for use in the construction of waterproof flooring panels, the characteristics of the various laminates make them ideal for use in a wide variety of applications where dual environments are encountered. For example, the laminates may be used as ceiling panels, exterior and interior wall panels and siding, countertops, furniture or anywhere different environments are encountered on opposite sides of a panel.

While the preferred embodiments have been shown and described, it will be understood that there is no intent to limit the invention by such disclosure, but rather, is intended to cover all modifications and alternate constructions falling within the spirit and scope of the invention as defined in the appended claims.

We Claim:

1. A decorative panel, comprising:

a decorative layer; and a backing layer bound to the decorative layer, the backing layer composed of at least one resin impregnated layer bound to a waterproofing layer which substantially prevents the penetration and release of moisture from the panel so as to maintain a constant moisture content within the decorative panel, wherein the at least one resin impregnated layer faces the decorative layer and the waterproofing layer is exposed to an external environment.

2. The decorative layer according to claim 1, further including a substrate positioned between the backing layer and the decorative layer.

3. The decorative panel according to claim 2, wherein the substrate is ABS foam.

4. The decorative panel according to claim 2, wherein the substrate is medium density fiberboard.

5. The decorative panel according to claim 4, wherein the waterproofing layer is a styrene-maleic anhydride copolymer.

6. The decorative panel according to claim 1, wherein the waterproofing layer is a hydrophobic waterproofing layer.

7. The decorative panel according to claim 6, wherein the hydrophobic waterproofing layer is a styrene-maleic anhydride copolymer.

8. The decorative layer according to claim 6, further including a substrate positioned between the backing layer and the decorative layer.

9. The decorative panel according to claim 8, wherein the substrate is ABS foam.

10. The decorative panel according to claim 8, wherein the substrate is medium density fiberboard.

11. The decorative panel according to claim 10, wherein the hydrophobic waterproofing layer is a styrene-maleic anhydride.

12. The decorative panel according to claim 1, wherein the at least one resin impregnated layer is phenolic resin impregnated paper.

13. The decorative panel according to claim 1, wherein the panel is shaped and dimensioned for use as a flooring panel.

14. A laminate, comprising:

a substrate layer; and a backing layer bound to the substrate layer, the backing layer composed of at least one resin impregnated layer bound to a waterproofing layer which substantially prevents the penetration and release of moisture from the laminate so as to maintain a constant moisture content within the laminate, wherein the at least one resin impregnated layer faces the substrate layer and the waterproofing layer is exposed to an external environment.

15. The laminate according to claim 14, wherein the substrate layer is an ABS foam.

16. The laminate according to claim 14, wherein the substrate layer is a medium density fiberboard.

17. The laminate according to claim 14, wherein the waterproofing layer is a styrene-maleic anhydride copolymer.

18. The laminate according to claim 17, wherein the substrate layer is an ABS foam.

19. The laminate according to claim 17, wherein the substrate layer is a medium density fiberboard.

20. The laminate according to claim 19, wherein the resin impregnated layer is a phenolic resin impregnated paper layer.

21. A laminate, comprising:

a first layer composed of a styrene-maleic anhydride copolymer which substantially prevents the penetration and release of moisture; and a second layer composed of at least one resin impregnated layer;

wherein the first layer is bound to the second layer to form a laminate which prevents the penetration and release of moisture so as to maintain a constant moisture content within the laminate.

22. The laminate according to claim 21, wherein the second layer is a phenolic resin impregnated paper.

23. The laminate according to claim 22, wherein the second layer is a phenol formaldehyde resin impregnated paper.

* * * * *

UNITED STATES PATENT AND TRADEMARK OFFICE
CERTIFICATE OF CORRECTION

PATENT NO. : 5,989,668
DATED : November 23, 1999
INVENTOR(S) : Nelson et al.

It is certified that error appears in the above-identified patent and that said Letters Patent is hereby corrected as shown below:

Drawings,
Delete drawing sheet 4, and substitute therefor drawing sheet 4 consisting of figures 4, as shown on the attached pages.

Signed and Sealed this

Fifth Day of November, 2002

Attest:

JAMES E. ROGAN
Attesting Officer     Director of the United States Patent and Trademark Office